Oct. 14, 1969 R. B. HARTMAN 3,472,256

FLUIDIC DIODES

Filed Dec. 7, 1966 3 Sheets-Sheet 1

INVENTOR
ROBERT B. HARTMAN
BY [signature]
ATTORNEY

INVENTOR
ROBERT B. HARTMAN
BY D. Verner Smythe
ATTORNEY

INVENTOR
ROBERT B. HARTMAN
BY
D. Kemon Smythe
ATTORNEY

United States Patent Office 3,472,256
Patented Oct. 14, 1969

3,472,256

FLUIDIC DIODES

Robert B. Hartman, Bridgeport, Conn., assignor to Remington Arms Company, Inc., Bridgeport, Conn., a corporation of Delaware Filed Dec. 7, 1966, Ser. No. 599,791
Int. Cl. F15c 1/10
U.S. Cl. 137—81.5 7 Claims

ABSTRACT OF THE DISCLOSURE

A fluid diode having at least three channels, two of which are angularly disposed, one of which is the forward direction fluid receiving channel which passes fluid flowing in a forward direction to the angularly disposed channel with which it joins, the third channel being arranged to receive fluid flow in a reverse direction. The diode also can include vent passage means at the junction of the three channels.

This invention relates to fluidic or pneumatic diode devices and to circuits including the fluid diode principle.

It is desirable to be able to provide a simple fluid component which has diode characteristics wherein the output flow, pressure, or a combination thereof in one or the forward direction is high and is very low in the other or reverse direction. Previous devices have employed complicated flow pattern arrangements. It also is desirable to be able to operate with laminar flow in both directions.

One of the objects of the invention is to provide a fluidic diode with front-to-back ratios higher than hitherto available.

Another of the objects of the invention is to provide a diode circuit capable of having a plurality of operating characteristics.

Another of the objects of the invention is to provide a diode switching arrangement capable of operating in one mode in a forward direction and in another mode in a reverse direction.

In one aspect of the invention, the diode may have a first or forward direction conduit with a forward direction input thereto and a forward direction output orifice or opening therefrom. A second conduit is arranged so that the axes of flow through it and the forward direction conduit are angularly disposed relative to each other. The second conduit has a forward direction input passage and an outlet. The orifices and passages are spaced and arranged relative to each other so that fluid flow from the first conduit will enter the input of the second conduit and flow therefrom toward the second conduit output. Flow in the reverse direction through the second conduit will miss or will not enter the first conduit in the reverse direction but will pass outwardly thereof. Thus, diode action is provided in that flow will occur in a forward direction through the first conduit into the second conduit but not in the reverse direction from the second conduit to the first conduit.

In another aspect, flow in the reverse direction can be employed to provide a signal which is isolated from the initial forward direction source. Thus, a second mode of operation will result.

In a still further aspect, the invention can be used in conjunction with an "AND" logic circuit by using a second first conduit means disposed on the other side of the axis of the second conduit. Vent means are substantially aligned with the second conduit for receiving flow therefrom in the reverse direction. It also is possible to use the pressure or flow in the last mentioned vent means to provide a signal for a second operational mode.

In yet another aspect, a plurality of first conduits may be angularly disposed relative to each other. A signal in any of these conduits will provide a signal in the second conduit to produce an "OR" logic circuit arrangement. If one of the first conduits is aligned with the second conduit, then a reverse direction signal will produce a second mode signal therein, so there will not be a diode action in relation to the aligned or in-line first conduit.

These and other objects, advantages and features of the invention will become apparent from the following description and drawings.

Figure 6:
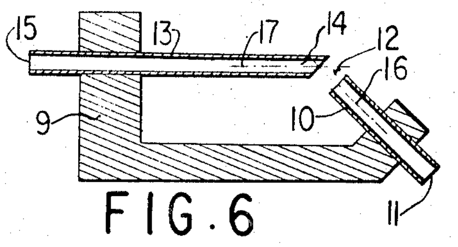
FIG. 6 is a sectional view of a simple form of the invention.

Referring to FIG. 6, first conduit 10 has a forward direction input 11 and a forward direction output orifice 12. Second conduit 13 has a forward direction input passage 14 and forward direction output passage 15. The axes 16 and 17 of the flow of the first conduit 10 and second conduit 13 at adjacent faces are angularly disposed relative to each other. A laminar flow producing conduit nozzle or other means is preferred to produce a higher front-to-back ratio. The conduits or tubes 10 and 13 can be mounted in a suitable block 9.

When air or fluid pressure enters tube 11 and passage 10 and exits along axis 16, the laminar flow from the forward direction conduit 10 will enter the second conduit 13 and pass therethrough toward the left in FIG. 6 and into forward direction output passage 15. Thus, the diode will operate in a forward direction.

If pressure is applied to passage 15, rather than passage 11, flow will take place from the left to the right in second conduit 13 out of passage 14 and will not enter orifice 12 of first conduit 10. Thus, there will be no flow in a reverse direction to passage 11. It is to be understood that the axes of fluid flow of orifices 12 and 14 are the effective axes of flow therefrom.

The edges of the orifice of passages are arranged so that a substantial portion of the flow from left to right in the second conduit 13 will not enter first conduit 10, while a substantial portion of the flow out of orifice 12 will enter reverse direction conduit 13 so as to pass through the diode in a forward direction.

The diode of the invention can take various forms. In one form plate 16' (FIG. 3) may have passages formed therein in accordance with the teachings in the patents to Plambeck, Nos. 2,760,863 and 2,791,504. As explained in said patents, the images of the various passages are photographically transferred to a photopolymerizable material and the passages then formed therein. The backing 17' (FIG. 3) may have the photopolymerizable material thereon. Also, the photopolymerizable material can be used alone with suitable supporting plates thereon. Other means such as etching, casting or molding also can be used in forming the plates and passages.

The plate 16' may be held between two plastic or other material holding members 19, 20, these being held together by suitable fastening means so as to clamp the plate 16' and backing plate 17' in place and eliminate leakage from the desired passages. Other supporting means, of course, can be used.

Figure 1:
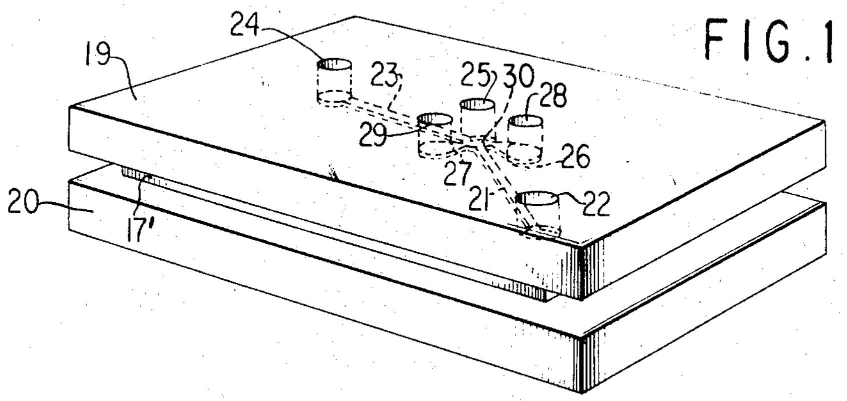
FIG. 1 is a perspective view of one form of the invention.

In the form shown in FIG. 1, the first conduit 21 has a forward direction input opening 22 communicating therewith. The second conduit 23 communicates with forward direction output passage 24. A vent passage 25 is located above the junctions of the first conduit 21 and second conduit 23. Pasages 26, 27 with vents 28, 29 at the end thereof also may be provided. Passages 26, 27 may be in the form illustrated in FIG. 2 wherein they widen out to the diameter of the vent passages 28, 29. The orifice 30 of the first conduit 21 is located so that flow therefrom will be directed into second conduit 23 and out of passage 24. Flow in the reverse direction from passage 24 into passage 23 will not enter the first conduit 21 but will instead pass through vent conduit 26 to vent 28.

Vent 26 is provided so that flow entering the device in an arbitrarily defined reverse direction from input 24 carries through channel 26 to vent 28 rather than building up a back pressure entering channel 21 to passage 22, which is an undesirable situation in a diode. The more venting that can be provided at the juncture of 23 and 21, the less chance of back pressure buildup. Thus, a better front-to-back ratio is obtained. By "front-to-back ratio" is meant the ratio between the pressure output when flow is in the forward direction to the presure output when the flow is in the reverse direction with the same input signal pressure.

The size of vent port 26 should be as short and large as possible to reduce the possiblity of back pressure buildup when the pressure is applied at vent 24 in the single diode embodiment. Any restriction in channel 26, vent 25 or channel 27 will tend to increase the back pressure and thus reduce the front-to-back pressure ratio.

The principles of the invention may be used in conjunction with a passive fluidic "AND" logic circuit. One form is shown in FIG. 4 which may have parts thereof arranged and constructed in the same general manner as that shown in FIGS. 1 to 3, inclusive. In FIG. 4, first conduits 40 and 42 have forward direction inputs 41 and 43, respectively. If fluid pressure is fed to passage 41 and conduit 40, it will pass through junction 44 into vent conduit 45 and vent passage 46. If fluid pressure is fed to input 43 only and through conduit 42, it will pass into vent passage 47 and vent 48. If fluid pressure is fed to both inputs 41 and 43, the jets of air will pass into second conduit 49 and to its output 50 to provide an "AND" function at 50. The jets combine and change direction so as to enter second conduit 49.

Figure 2:
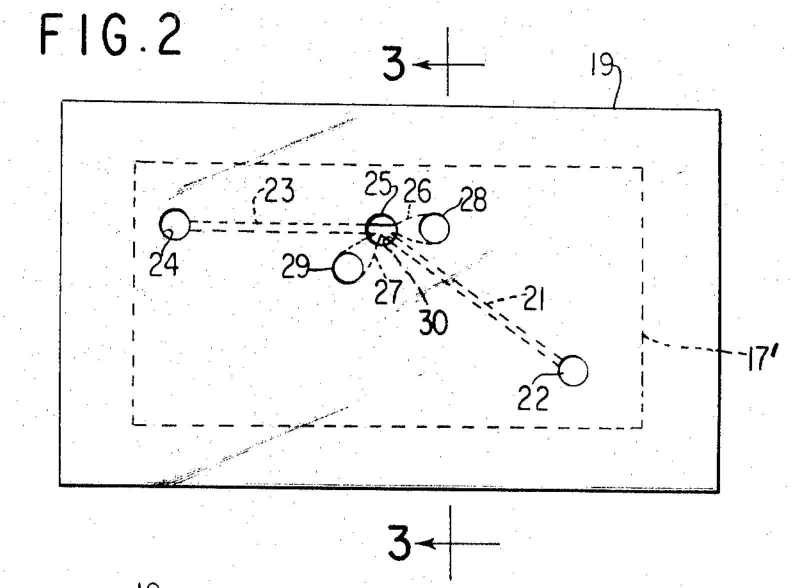
FIG. 2 is a plan view of FIG. 1.
Figure 3:
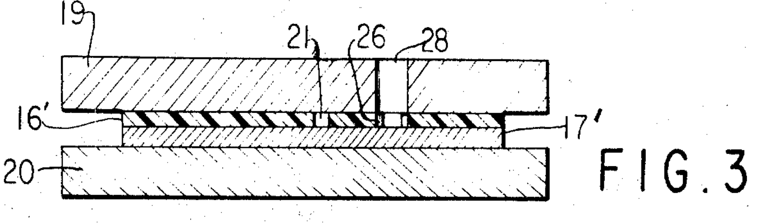
FIG. 3 is a view taken along the line 3—3 of FIG. 2.
Figure 4:
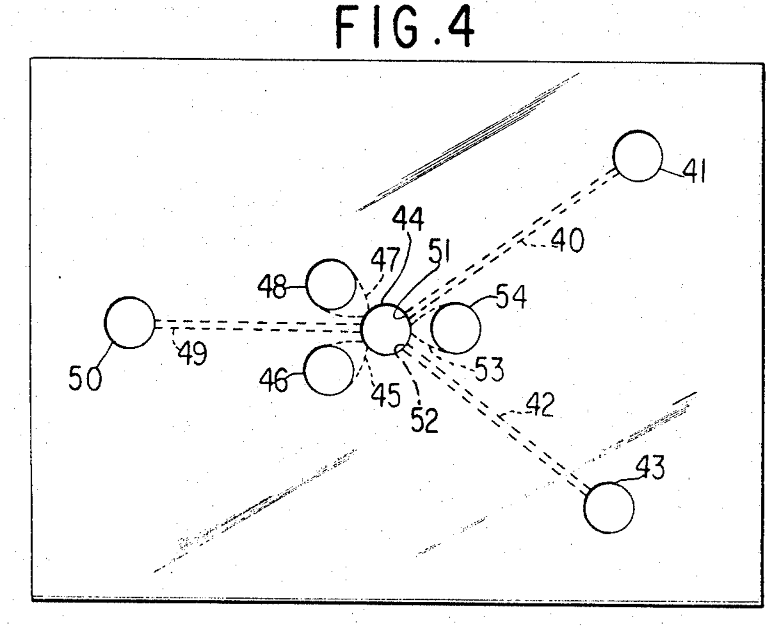
FIG. 4 is a plan view of a logic device employing the principles of the invention.

In the event fluid pressure is applied at 50 through second conduit 49, the orifices 51, 52 in the opening of the forward direction conduits 40, 42 are located similar to orifice 30 of FIGS. 1 to 3, inclusive, and orifice 12 of FIG. 6 so that the flow will not enter either of conduits 40 or 42, but instead will pass into reverse flow vent passage 53 to vent 54. Such reverse flow may be used as a second mode of operation by utilizing the signal from passage or vent 54.

It has been found that the spacing of the orifices relative to each other and the angle of the axes of the existing flow relative to each other are interrelated and should be kept within certain parameters. If the distance between the orifice and receiving channel or conduit, for a fixed angle, is increased beyond a certain predeterminable point, the flow transfer will be insufficient. If this angle is increased excessively, the flow transfer also may be insufficient and there may be interaction between inputs not normally existent.

Figures 7, 8, 9:
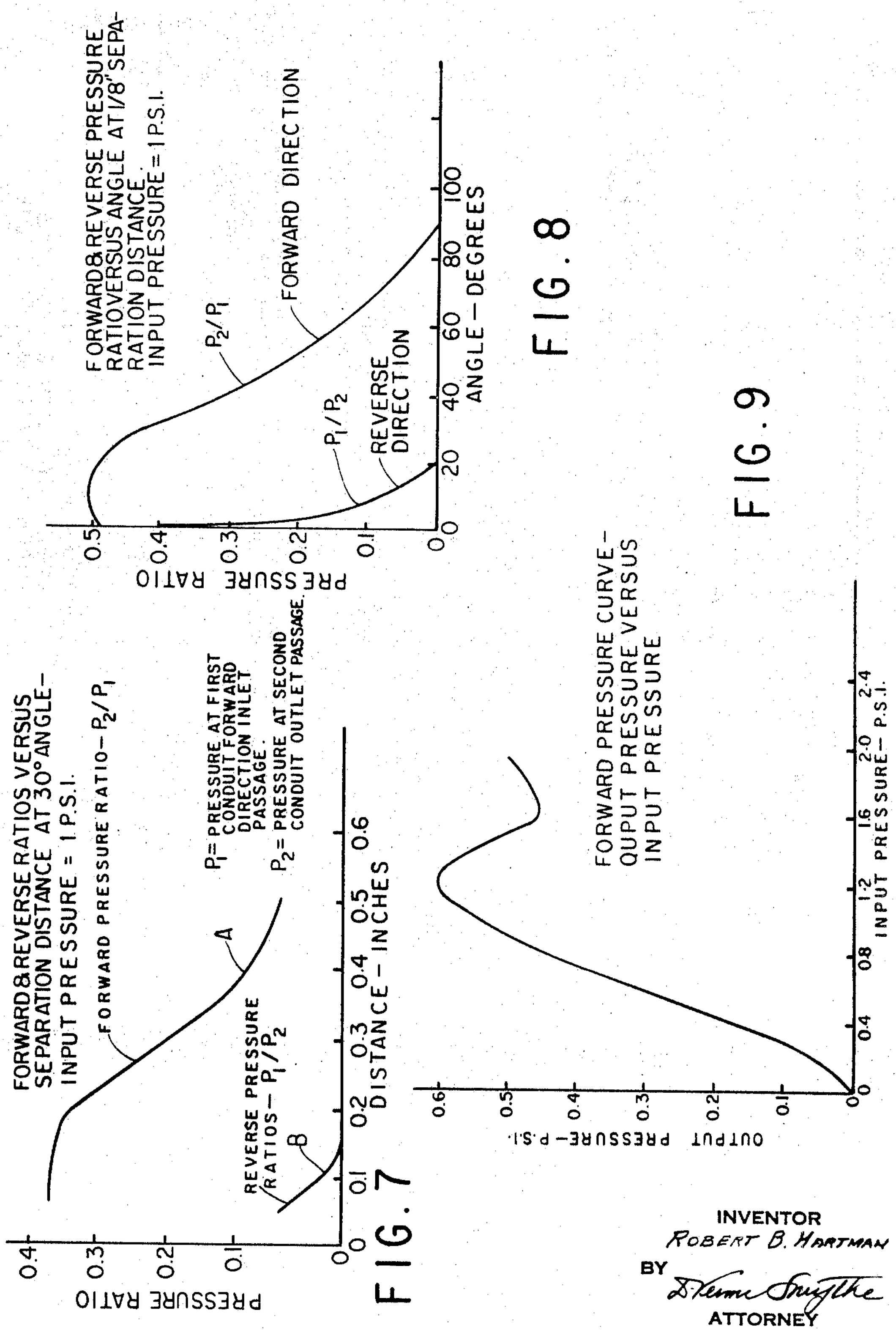
FIG. 7 is a graph showing a typical relation of pressure ratio to distance apart of the conduit passages.
FIG. 8 is a graph showing a typical pressure ratio to angular relation of the axes of flow.
FIG. 9 is a graph showing a typical relation of output pressure to input pressure.

Referring to FIG. 7, the relation between the forward and reverse pressure ratios versus the distance apart for a 30° angle is shown. In this typical case, it can be seen that at approximately a distance of .15" maximum diode performance is reached, the forward pressure ratio $P_2/P_1$ curve A remaining substantially flat until about 0.2" separation is attained and $P_1/P_2$ being substantially zero. This curve was determined by the use of two conduits of approximately .032" I.D x 2" in length, and the pressures involved were in the range of 1 p.s.i. input. The curve B ($P_1/P_2$) shows the reverse pressure curve which falls substantially to zero at .15" indicating that at this point, an optimum diode characteristic is attained with maximum forward pressure and minimum back pressure.

FIG. 8 shows the relation between change in angle of axes of the flow at a fixed separation of ⅛", again at 1 p.s.i. with the same dimension tubes or conduits. It shows that the optimum angle in this case is approximately 20° which is the optimum for maximum forward pressure output with minimum reverse pressure output.

FIG. 9 shows the forward pressure versus the output pressure past the laminar flow region of operation. It can be seen that as the input pressure is increased, laminar flow exists until approximately 1.22 p.s.i. input pressure.

By adjusting dimensional parameters, the diode characteristics can be modified for maximum flow or pressure transfer or conditions.

Figure 5:
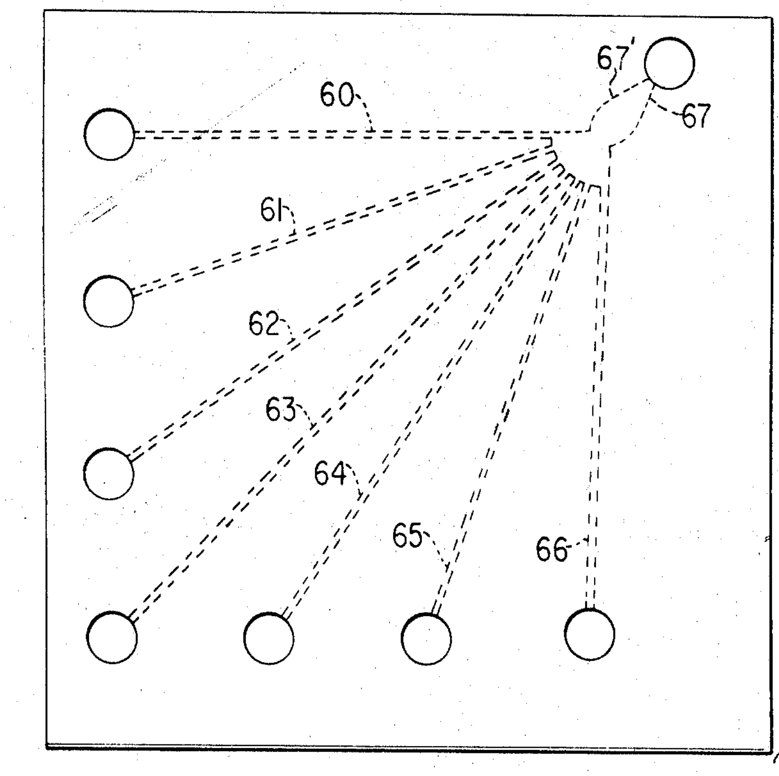
FIG. 5 is another logic arrangement using the principles of the invention.

Referring to FIG. 5, the use of the invention in conjunction with a passive "OR" logic circuit is illustrated. In this case, there may be a plurality of forward or first direction conduits 60, 61, 62, 63, 64, 65, 66, the orifices of which are directed toward conduit 67. The conduit 67 may have contoured walls 67' so as to aid in receiving the laminar flow from the outer first direction conduits such as 60 and 66. Passage of air through any of the conduits 60 to 66, inclusive, in a forward direction will enter output conduit 67 and provide a signal thereto to create an "OR" circuit configuration.

In the case of reverse flow through 67 toward conduits 60 to 66, diode action will be provided with the exception of the center or in-line conduit 63. In this instance, a reverse direction signal will result, which may be used as a second mode operation output. In such an instance, a laminar flow producing output from conduit 67 should be provided.

It can be seen in FIGS. 4 and 5 that the inputs are substantially independent with no interaction.

What is claimed is:

1. In a fluid diode, the combination including a first conduit having a forward direction input passage and having a forward direction output orifice, a second conduit having a forward direction input passage and a forward direction output passage, said first conduit orifice and second conduit forward direction input passage being adjacent each other with the axes of the path of fluid flow thereof angularly disposed relative to each other so that fluid flow out of said first conduit orifice will enter said second conduit input passage and fluid flow in a reverse direction from said second conduit will not enter said first conduit, and a third conduit having its axis disposed to receive reverse flow from said second conduit.

2. A fluid diode according to claim 1 wherein the conduit means are formed in a photopolymerizable plate means and the plate means is held in a supporting structure means covering said conduits.

3. A fluid diode according to claim 1 wherein the third conduit aligned with the axis of said second conduit receives fluid in a reverse direction from said second conduit to provide a second mode of operation.

4. In a fluid diode "AND" logic circuit, the combination including a first conduit having a forward direction input passage and having a forward direction output orifice, a second conduit having a forward direction input passage and a forward output passage, said first conduit orifice and second conduit forward direction input passage being adjacent each other with the axes of the path of fluid flow thereof angularly disposed relative to each other, another first conduit located on the opposite side of the axis of the second conduit than the first mentioned first conduit, vent means aligned with each of said first conduits at the junction of said conduits so that there must be flow through both of said first conduits to produce a signal at the output of the second conduit, and vent means aligned with said second conduit leading into the junction of said conduits receiving substantially all of the flow in the reverse direction from said second conduit.

5. A fluid diode circuit according to claim 4 wherein the vent means aligned with said second conduit may be connected to a signal receiving device for operating in a second mode under reverse flow conditions.

6. In a fluid diode, the combination including a first conduit having a forward direction input passage and having a forward direction output orifice, a second conduit having a forward direction input passage and a forward direction output passage, said first conduit orifice and second conduit forward direction input passage being adjacent each other with the axes of the path of fluid flow thereof angularly disposed relative to each other so that fluid flow out of said first conduit orifice will enter said second conduit input passage and fluid flow in a reverse direction from said second conduit will not enter said first conduit, and vent passage means adjacent the junction of said conduits.

7. A fluid diode according to claim 6 wherein there is a vent conduit connected to said reverse direction conduit to receive fluid therefrom when it passes therethrough in the reverse direction.

References Cited

UNITED STATES PATENTS

| | | | |
|---|---|---|---|
| 1,329,559 | 2/1920 | Tesla | 137—81.5 XR |
| 3,068,880 | 12/1962 | Riordan | 137—81.5 |
| 3,191,623 | 6/1965 | Bowles | 137—81.5 |
| 3,272,212 | 9/1966 | Bowles | 137—81.5 |
| 3,272,214 | 9/1966 | Warren | 137—81.5 |
| 3,375,842 | 4/1968 | Reader | 137—81.5 |

FOREIGN PATENTS

| | | |
|---|---|---|
| 1,391,362 | 1/1965 | France. |

OTHER REFERENCES

"The Amateur Scientist," C. L. Stong, Scientific American, vol. 207, No. 2 August 1962, pp. 128–138.

SAMUEL SCOTT, Primary Examiner